United States Patent
Chung et al.

(10) Patent No.: US 12,041,439 B2
(45) Date of Patent: Jul. 16, 2024

(54) PREVENTING EAVESDROPPING RESOURCES FROM ACQUIRING UNAUTHORIZED DATA VIA MECHANICALLY EXCITABLE SENSORS

(71) Applicant: Google LLC, Mountain View, CA (US)

(72) Inventors: Vincent P. J. Chung, Hsinchu (TW); Wei Liang Liu, Taoyuan (TW)

(73) Assignee: Google LLC, Mountain View, CA (US)

( * ) Notice: Subject to any disclaimer, the term of this patent is extended or adjusted under 35 U.S.C. 154(b) by 246 days.

(21) Appl. No.: 17/659,254

(22) Filed: Apr. 14, 2022

(65) Prior Publication Data

US 2022/0322079 A1 Oct. 6, 2022

Related U.S. Application Data

(60) Provisional application No. 63/362,951, filed on Apr. 13, 2022.

(51) Int. Cl.
*H04L 12/02* (2006.01)
*H04R 29/00* (2006.01)
*H04W 12/02* (2009.01)

(52) U.S. Cl.
CPC .......... *H04W 12/02* (2013.01); *H04R 29/004* (2013.01)

(58) Field of Classification Search
CPC ....... H04W 12/02; H04W 4/38; H04R 29/004
See application file for complete search history.

(56) References Cited

U.S. PATENT DOCUMENTS 10,488,223 B1 11/2019 Yee et al.
10,841,693 B1* 11/2020 Ganeshkumar ........ G10K 11/34
11,462,230 B1* 10/2022 Sztuk .................. G10L 21/0232
11,490,248 B2* 11/2022 Baker ................. G06F 3/04817
2017/0208416 A1 7/2017 Petrov
2017/0338804 A1 11/2017 Gunther et al.
2018/0277138 A1* 9/2018 Kudryavtsev ....... G10L 21/0232
2020/0275221 A1 8/2020 Bernal Castillo et al.
2020/0279205 A1 9/2020 Gong et al.
2021/0400373 A1* 12/2021 Marti .................. G10K 11/178

OTHER PUBLICATIONS

Kune, "Ghost Talk: Mitigating EMI Signal Injection Attacks against Analog Sensors", Jun. 2013, 15 pages.
Roth, "Simulation of the Effects of Acoustic Noise on MEMS Gyroscopes", Master Thesis, Auburn University, 2009, Aug. 2009, 120 pages.
Son, et al., "Rocking Drones with Intentional Sound Noise on Gyroscopic Sensors", Aug. 2015, 17 pages.
Soobramaney, "Mitigation of the Effects of High Levels of High-Frequency Noise on MEMS Gyroscopes", Aug. 2013, 200 pages.

* cited by examiner

*Primary Examiner* — Baotran N To
(74) *Attorney, Agent, or Firm* — Colby Nipper PLLC (57) ABSTRACT

This document describes techniques and apparatuses directed at preventing eavesdropping resources from acquiring unauthorized data via mechanically excitable sensors. In aspects, an electronic device includes a privacy manager configured to analyze one or more signals generated by a mechanically excitable sensor. Responsive to the analysis, the privacy manager may extract unauthorized data from the one or more signals based on a signal received at a mechanical transducer, and further based on calibration data collected during an interaction between the mechanically excitable sensor and the mechanical transducer during a prior calibration sequence.

9 Claims, 7 Drawing Sheets

PREVENTING EAVESDROPPING RESOURCES FROM ACQUIRING UNAUTHORIZED DATA VIA MECHANICALLY EXCITABLE SENSORS

RELATED APPLICATION

This application claims priority under 35 U.S.C. § 119(e) to U.S. Provisional Patent Application 63/362,951, filed on Apr. 13, 2022 which is incorporated herein by reference in its entirety.

SUMMARY

This document describes systems and techniques for preventing eavesdropping resources from acquiring unauthorized data via mechanically excitable sensors. In aspects, a method is disclosed that includes: receiving a first electrical signal from an inertial measurement unit, the first electrical signal including first signal elements representing one or more mechanical excitations sensed by the inertial measurement unit; receiving a second electrical signal associated with a mechanical transducer, the second electrical signal including second signal elements associated with at least one of the one or more mechanical excitations sensed by the inertial measurement unit; responsive to receiving the first electrical signal and the second electrical signal, generating, based at least in part on calibration data collected during an interaction between the inertial measurement unit and the mechanical transducer during a prior calibration sequence and the second electrical signal, a third electrical signal including third signal elements, the third signal elements including one or more signal elements of the first signal elements and excluding one or more other first signal elements corresponding to second signal elements; and passing the third electrical signal to a resource in lieu of the first electrical signal effective to reduce the amount of information associated with the one or more mechanical excitations sensed by the inertial measurement unit to be received by the resource.

This document also describes computer-readable media having instructions for performing the above-summarized methods and other methods set forth herein, as well as systems and means for performing these methods.

The details of one or more implementations are set forth in the accompanying Drawings and the following Detailed Description. Other features and advantages will be apparent from the Detailed Description, the Drawings, and the Claims. This Summary is provided to introduce subject matter that is further described in the Detailed Description. Accordingly, a reader should not consider the Summary to describe essential features nor threshold the scope of the claimed subject matter.

BRIEF DESCRIPTION OF DRAWINGS

The details of one or more aspects for preventing eavesdropping resources from acquiring unauthorized data via mechanically excitable sensors are described in this document with reference to the following Drawings, in which the use of same numbers in different instances may indicate similar features or components.

DETAILED DESCRIPTION

Overview

Many electronic devices, such as smartphones, include numerous sensors configured to sense various characteristics associated with an external environment or a user. These sensors enable electronic devices to acquire data, perform calculations, and/or provide valuable information to users. For instance, some electronic devices include pressure sensors (e.g., barometric pressure sensors) configured to gauge an ambient atmospheric pressure and enable electronic devices to provide useful, meteorological information to users (e.g., a prediction of short-term changes in weather). In other instances, some electronic devices include microphones configured to receive and convert sound waves into electrical energy and, thereby, enable electronic devices to amplify, transmit, or record audio. In still further instances, some electronic devices include inertial measurement units configured to measure an angular rate, velocity, gravitational force, and/or orientation of an electronic device. These, and other sensors not mentioned, are highly valued by user's in electronic devices due to their utility.

In some cases, however, unauthorized resources (e.g., applications, malware, internet webpage) can exploit or abuse some of these sensors to acquire unauthorized data. For example, a pressure sensor in an electronic device may be exploited to detect sound, including speech of a user or tones produced by an automated teller machine (ATM) when entering a password identification number (PIN), since sound is the propagation of pressure waves through a medium. In another instance, an inertial measurement unit in an electronic device may be exploited to detect inputs at the device, including keystrokes at a keyboard, and used determine (e.g., keystroke decoding) data about a user. As a result, unauthorized actors may exploit mechanically excitable sensors to acquire unauthorized data by which to determine characteristics of an environment or a user.

To this end, this document describes techniques and apparatuses directed at preventing eavesdropping resources from acquiring unauthorized data via mechanically excitable sensors. In aspects, an electronic device includes a privacy manager configured to analyze one or more signals generated by a mechanically excitable sensor. Responsive to the analysis, the privacy manager may extract unauthorized data from the one or more signals based on a signal received at a mechanical transducer, and further based on calibration data collected during an interaction between the mechanically excitable sensor and the mechanical transducer during a prior calibration sequence.

The following discussion describes operating environments and techniques that may be employed in the operating environments and example methods. Although systems and techniques for preventing eavesdropping resources from acquiring unauthorized data via mechanically excitable sensors are described, it is to be understood that the subject of the appended Claims is not necessarily limited to the specific features or methods described. Rather, the specific features and methods are disclosed as example implementations and reference is made to the operating environment by way of example only.

Operating Environment

Figure 1:
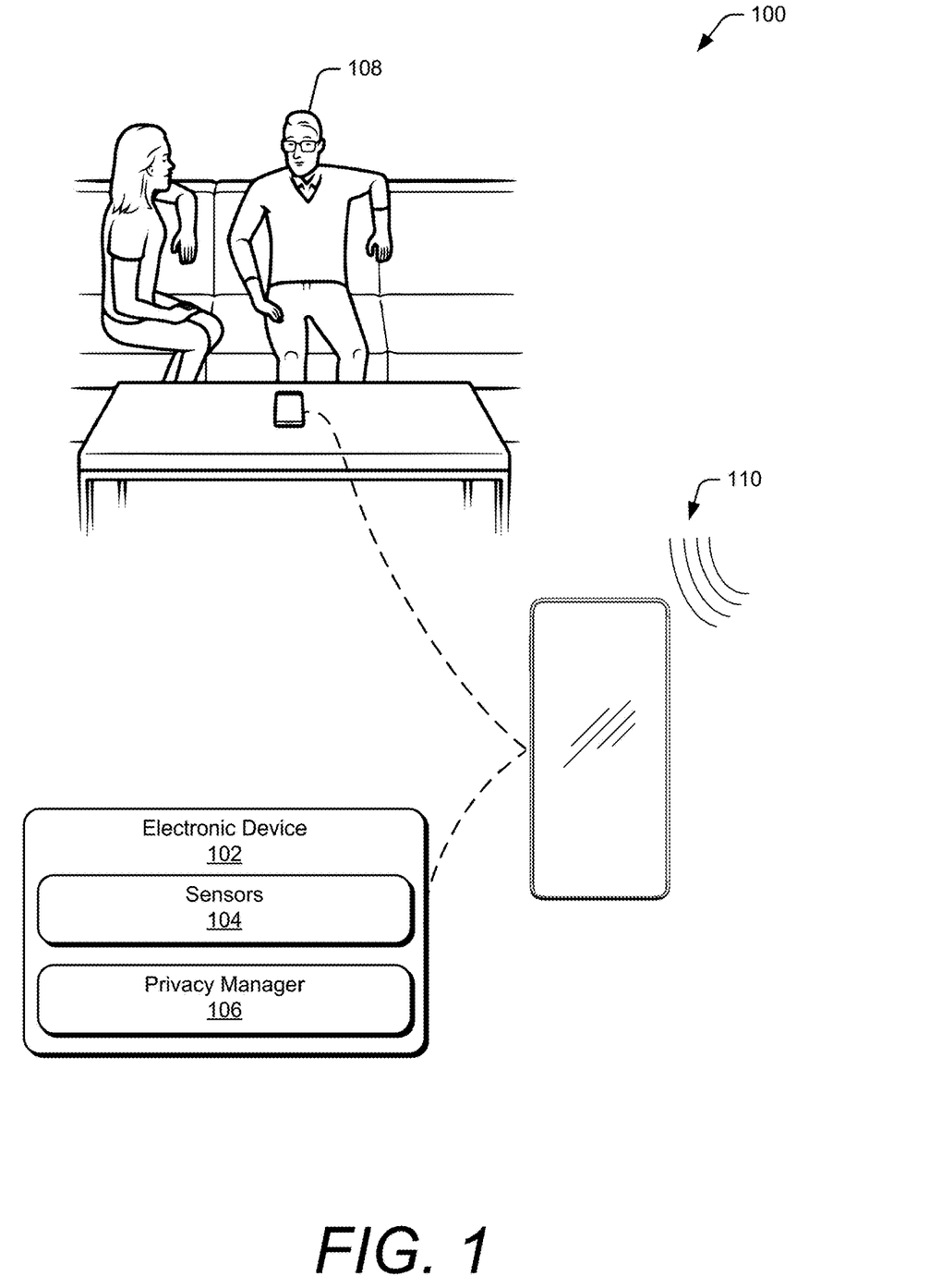
FIG. 1 illustrates an example implementation of an electronic device having a plurality of sensors and a privacy manager in accordance with some implementations.

Consider FIG. 1, which illustrates an example implementation 100 of an electronic device 102 having a plurality of sensors 104 and a privacy manager 106 in accordance with some implementations. In one example, a user 108 is speaking to a friend, while his electronic device 102 rests on a table. The electronic device 102 may be in an inactive state (e.g., a dark display screen, but powered on) or an active state (e.g., a bright display screen), executing many background processes, such as maintaining wireless connections, and/or executing one or more foreground process, such as having an active application responding to an event initiated by the user 108. In the example illustrated in FIG. 1, the electronic device 102 is in the inactive state executing background processes of, for example, an operating system and applications.

The electronic device 102 includes the plurality of sensors 104 configured to sense an external environment so as to acquire data, perform calculations, and/or provide valuable information to the user 108. One or more of the sensors may be mechanically excitable via, for example, mechanical forces (e.g., contact between two solid bodies) or mechanical waves (e.g., vibrations, sound) in gases, liquids, and solids. As illustrated in FIG. 1, mechanical waves 110 (e.g., speech) originating from the user 108 propagate outwards through air and reach the electronic device 102. One or more of the mechanically excitable sensors of the plurality of sensors 104 may be affected by the propagating mechanical waves 110.

An eavesdropping resource (e.g., an application) having access to at least one mechanically excitable sensor, but not authorized to access another sensor (a "restricted sensor"), may attempt to use the at least one mechanically excitable sensor, in response to the lack of authorization to access the restricted sensor, to acquire data ("unauthorized data") that the restricted sensor is configured to acquire (e.g., solely configured to acquire). As illustrated in FIG. 1, for example, an eavesdropping resource executing in a background process and not having authorization to access a microphone, may attempt to use an inertial measurement unit to sense mechanical waves 110 and acquire audio data relating to the user 108.

The privacy manager 106, executing in a background process, can thwart the attempt to acquire unauthorized data by the eavesdropping resource by analyzing one or more signals generated by the mechanically excitable sensor and extracting unauthorized data from the one or more signals based on a signal received at a mechanical transducer (e.g., the restricted sensor, a speaker, a microphone), and further based on calibration data collected during an interaction between the mechanically excitable sensors and the mechanical transducer during a prior calibration sequence.

Figure 2:
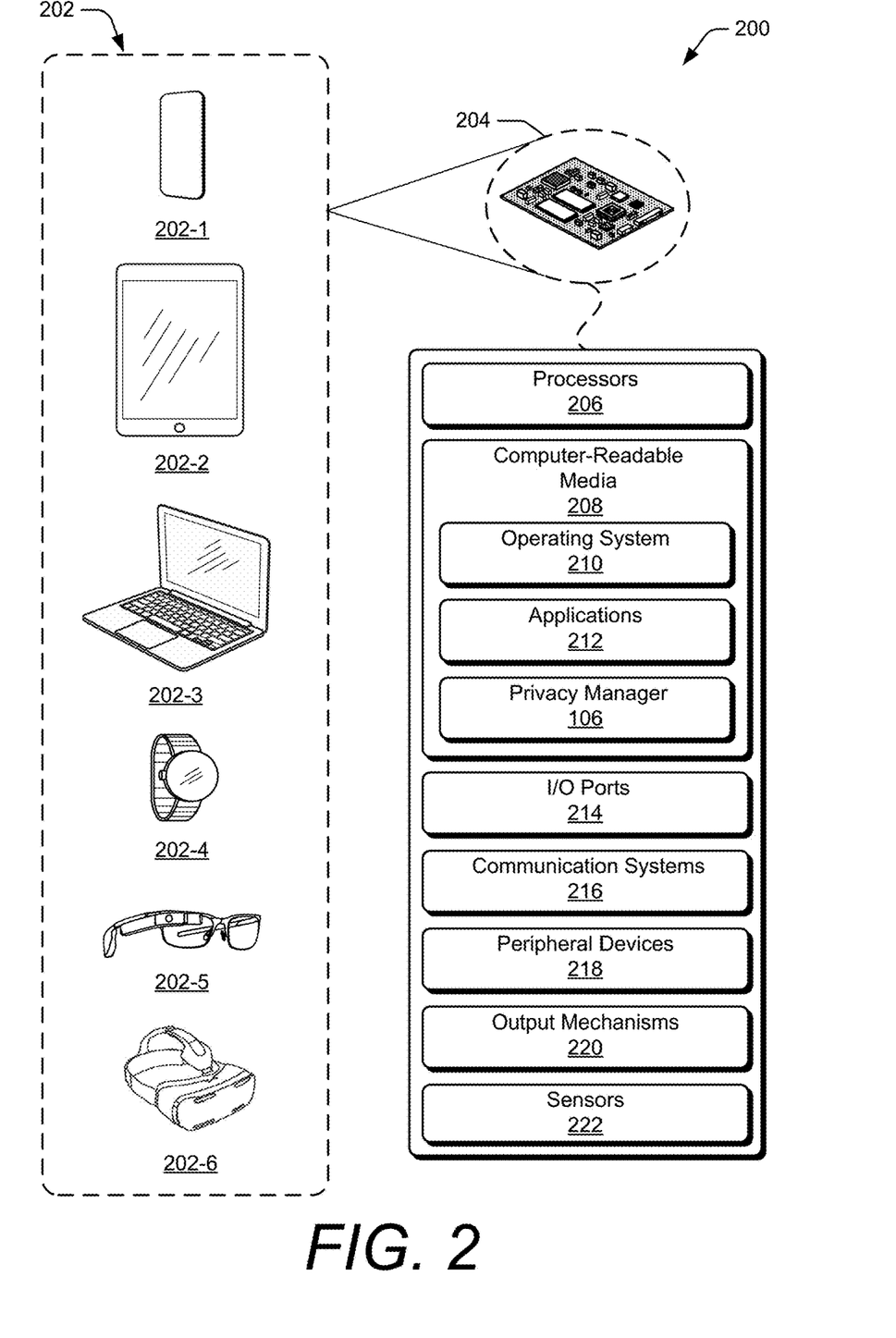
FIG. 2 illustrates an example operating environment that includes an example electronic device, which is capable of implementing the privacy manager in accordance with one or more implementations.

In more detail, FIG. 2 illustrates an example operating environment 200 that includes an example electronic device (e.g., electronic device 102), which is capable of implementing the privacy manager 106 in accordance with one or more implementations. Examples of an electronic device 202 include a smartphone 202-1, a tablet 202-2, a laptop 202-3, a smartwatch 202-4, smart-glasses 202-5, and virtual-reality (VR) goggles 202-6. Although not shown, the electronic device 102 may also be implemented as any of a mobile station (e.g., fixed- or mobile-STA), a mobile communication device, a client device, a home automation and control system, an entertainment system, and the like. Note that the electronic device 202 can be wearable, non-wearable but mobile, or relatively immobile (e.g., desktops, appliances). Further, the electronic device 202, in implementations, may be an implanted device (e.g., devices that are embedded in the human body), including radio-frequency identification (RFID) microchips, near-field communication (NEC) microchips, and so forth. Note also that the electronic device 202 can be used with, or embedded within, electronic devices or peripherals, such as in automobiles (e.g., steering wheels) or as an attachment to a laptop computer. The electronic device 202 may include components or interfaces omitted from FIG. 2 for the sake of clarity or visual brevity.

For example, although not shown, the electronic device 202 can also include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

As illustrated, the electronic device 202 includes a printed circuit board assembly 204 (PCBA 204) on which components and interconnects of the electronic device 202 are embodied. Alternatively or additionally, components of the electronic device 202 can be embodied on other substrates, such as flexible circuit material or other insulative material. The electronic device 202 also includes a frame defining a housing having an internal cavity. In some implementations, the housing may include a display, an electroluminescent display (ELD), an active-matrix organic light-emitting diode display (AMOLED), a liquid crystal display (LCD), or the like. Although not illustrated, various other electronic components or devices can be housed in the internal cavity of the device. Generally, electrical components and electromechanical components of the electronic device 202 are assembled onto a printed circuit board (PCB) to form the PCBA 204. Various components of the PCBA 204 (e.g., processors and memories) are then programmed and tested to verify the correct function of the PCBA 204. The PCBA 204 is connected to or assembled with other parts of the electronic device 202 into a housing.

As illustrated, the PCBA 204 includes one or more processors 206 and computer-readable media 208. The processors 206 may include any suitable single-core or multi-core processor. The processors 206 may be configured to execute instructions or commands stored within computer-readable media 208. The computer-readable media 208 can include computer-readable storage media having an operating system 210, applications 212, and a privacy manager 106. In at least some implementations, applications 212 and/or the operating system 210 implemented as computer-readable instructions on the computer-readable media 208 can be executed by the processors 206 to provide some or all of the functionalities described herein, such as some or all of the functions of the privacy manager 214 (shown within the computer-readable media 404, though this is not required).

The PCBA 204 may also include input/output (I/O) ports 214. The I/O ports 214 allow the electronic device 202 to interact with other devices or users, conveying any combination of digital signals, analog signals, and radiofrequency (RF) signals. The I/O ports 214 may include any combination of internal or external ports, such as universal serial bus (USB) ports, audio ports, Serial ATA (SATA) ports, peripheral component interconnect express (PCI-express) based ports or card-slots, secure digital input/output (SDIO) slots, and/or other legacy ports. Various devices may be operatively coupled with the I/O ports 214, such as human-input devices (HIDs), external computer-readable storage media, or other peripherals.

The PCBA 204 may further include communication systems 216. The communication systems 216 enable communication of device data, such as received data, transmitted data, or other information as described herein, and may provide connectivity to one or more networks and other devices connected therewith. Example communication systems include NFC transceivers, WPAN radios compliant with various IEEE 802.15 (Bluetooth®) standards, WLAN radios compliant with any of the various IEEE 802.11 (WiFi®) standards, WWAN (3GPP-compliant) radios for cellular telephony, wireless metropolitan area network (WMAN) radios compliant with various IEEE 802.16 (WiMAX®) standards, infrared (IR) transceivers compliant with an Infrared Data Association (IrDA) protocol, and wired local area network (LAN) Ethernet transceivers. Device data communicated over communication systems 216 may be packetized or framed depending on a communication protocol or standard by which the electronic device 202 is communicating. The communication systems 216 may include wired interfaces, such as Ethernet or fiber-optic interfaces for communication over a local network, private network, intranet, or the Internet. Alternatively or additionally, the communication systems 216 may include wireless interfaces that facilitate communication over wireless networks, such as wireless LANs, cellular networks, or WPANs.

The PCBA may further include one or more of peripheral devices 218, output mechanisms 220, and sensors 222 (e.g., sensors 104). The peripheral devices 218, output mechanisms 220, and sensors 222 may be operably coupled to the PCBA 204 via I/O ports 214 and/or communication systems 216. Peripheral devices 218 may input or output data to or from the electronic device 202. The peripheral devices 218 may be implemented as any of a keyboard, a speaker, a remote display, a hand-held pointing device (e.g., a computer mouse), and the like. Output mechanisms 220 may be implemented as lights, speakers, or haptic interfaces. The sensors 222 can include any of a variety of sensors, such as an audio sensor (e.g., a microphone), a pressure sensor (e.g., a barometric pressure sensor), a micro-electromechanical system (MEMS) inertial measurement unit (IMU), or a touch-input sensor (e.g., a touchscreen). In implementations, one or more of the sensors 222 may be mechanically excitable. Further, as described herein, a mechanical transducer may include any one of the peripheral devices 218, the output mechanisms 220, and the sensors 222 configured to convert one form of energy to another. For example, a mechanical transducer may be configured to convert electrical energy into acoustic waves (e.g., a speaker). In another example, a mechanical transducer may be configured to convert acoustic waves into electrical energy (e.g., a microphone).

Figure 3:
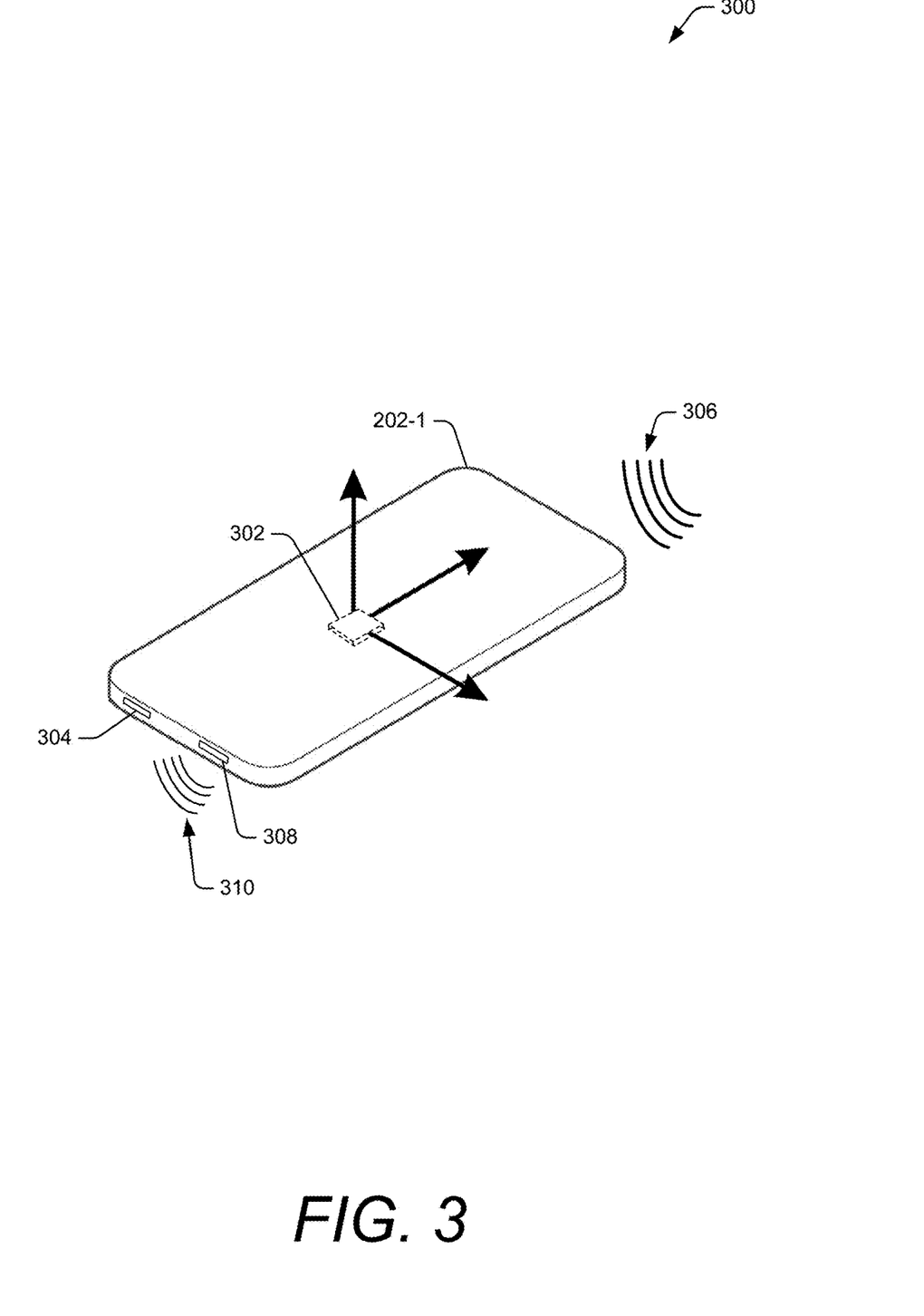
FIG. 3 illustrates an example implementation of mechanically excitable sensors in accordance with one or more implementations.

Consider FIG. 3, which illustrates an example implementation of mechanically excitable sensors in accordance with one or more implementations. As illustrated, an electronic device (e.g., electronic device 202-1) includes a plurality of sensors (e.g., sensors 222), including a MEMS IMU 302 and a microphone 304. In some examples, the electronic device may further include a speaker 308 configured to output acoustic waves 310.

The MEMS IMU 302 may be configured to determine an orientation or acceleration of the electronic device. In an example, the MEMS IMU 302 can be configured having a sensitivity sufficient to detect mechanical waves 306 (e.g., acoustic waves) propagating through a medium, including gas (e.g., air) and solids (e.g., the housing of the electronic device, a body on which the electronic device rests).

In this particular example, an eavesdropping resource not authorized to access the microphone 304, may attempt to receive audio input (e.g., contained within the mechanical waves 306) via the MEMS IMU 302. In some cases, the eavesdropping resource may attempt to determine information in audio output (e.g., contained within the acoustic waves 310) produced by the speaker 308 via the MEMS IMU 302.

The privacy manager 106 may include or implement techniques of one or more algorithms, including a machine-learned model, a compensation algorithm, a physics-based deterministic model, a filtering algorithm, and so on. In some examples, the privacy manager 106 may include a mechanical excitation compensation block, including hardware filtering components. The privacy manager 106 may be configured to receive a first electrical signal from a mechanically excitable sensor, such as the MEMS IMU 302, and a second electrical signal from a mechanical transducer, such as the microphone 304 or the speaker 308, and generate a third electrical signal including one or more signal elements of the first signal and excluding signal elements corresponding to or found within the second signal. The third electrical signal may be generated based at least in part on calibration data collected during an interaction between the MEMS IMU and the mechanical transducer during a prior calibration sequence and the second electrical signal. The first, second, and third electrical signals may include signal elements representing one or more mechanical excitations sensed by the IMU.

Figure 4:
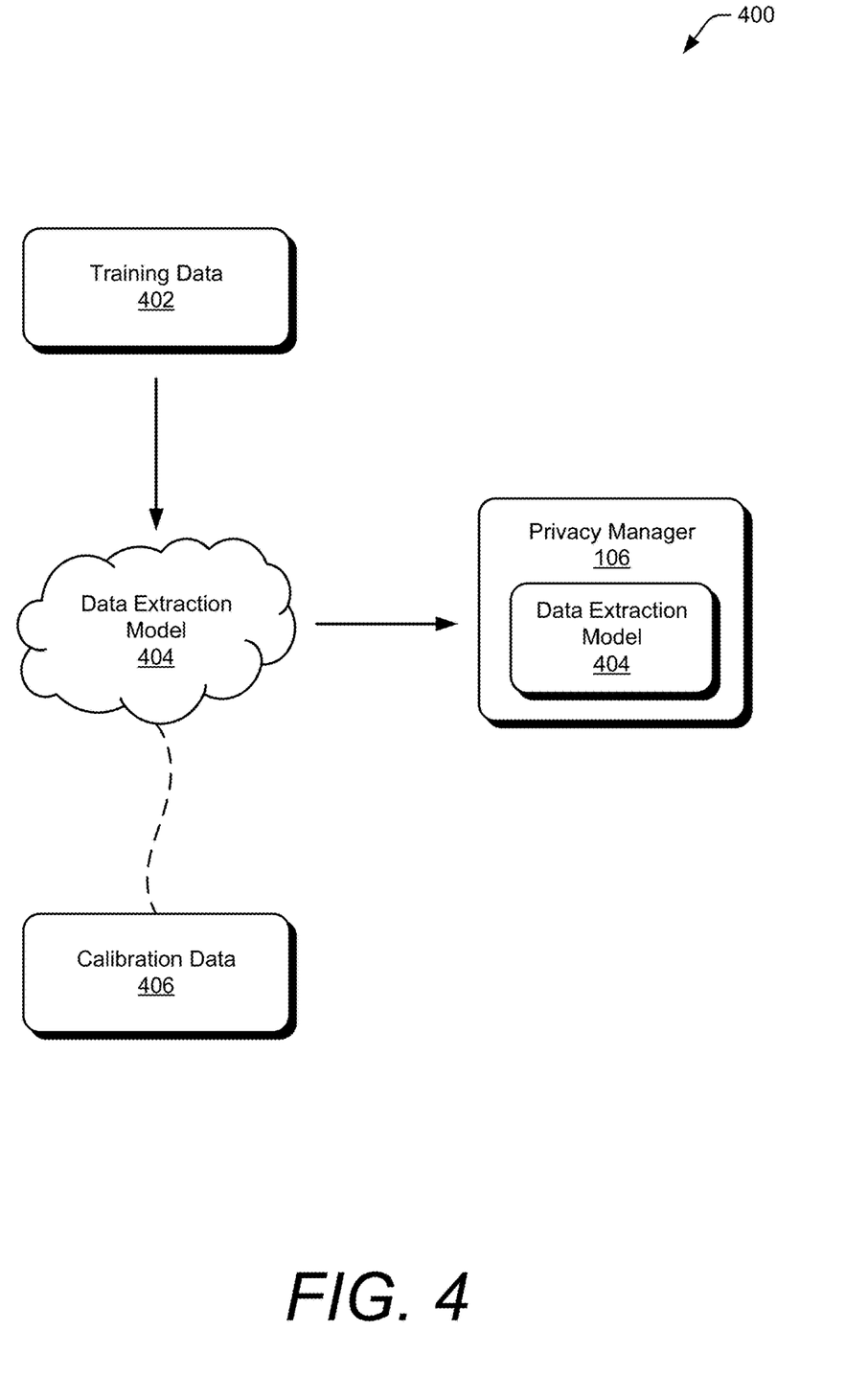
FIG. 4 illustrates the privacy manager implementing a machine-learned technique.

In at least some examples, as illustrated in FIG. 4, the privacy manager 106 implements a machine-learned technique ("data extraction model" 404). The data extraction model 404 may be implemented as one or more of a support vector machine (SVM), a recurrent neural network (RNN), a convolutional neural network (CNN), a dense neural network (DNN), one or more heuristics, other machine-learning techniques, a combination thereof, and so forth. The data extraction model 404 may be iteratively trained (e.g., on-device, off-device) by exposure to training scenes, sequences, and/or events ("prior calibration sequence") and, as a result, generate calibration data 406. For example, training can involve exposing the data extraction model 404 to training data 402 of first electrical signals from a mechanically excitable sensor and second electrical signals from a mechanical transducer produced by one or more events configured to mechanically excite both the mechanically excitable sensor and the mechanical transducer. Exposure to the training data 402 trains the data extraction model 404 to identify signal patterns in and between first electrical signals and second electrical signals corresponding to, or resultant of, an event (e.g., an identical event). In this way, the data extraction model 404 can identify signal elements within first electrical signals corresponding to signal elements within second electrical signals and extract or reduce those signal elements within first electrical signals. After sufficient training, the data extraction model 404 and/or calibration data 406 can then be deployed to the computer-readable media 208 of the electronic device 202 as an independent module or implemented in the privacy manager 106.

In another example, the data extraction model 404 can be trained to predict an electrical signal produced by a mechanically excitable sensor before a mechanical transducer converts an electrical signal into mechanical waves by analyzing the electrical signal passed to the mechanical transducer. For example, the data extraction model 404 can predict a first electrical signal that may be produced by a MEMS IMU based on receiving a second electrical signal passed to a smart amplifier of a speaker. The data extraction model 404 can then generate a third electrical signal including one or more signal elements of the first signal elements and excluding one or more other first signal elements corresponding to second signal elements.

Figure 5:
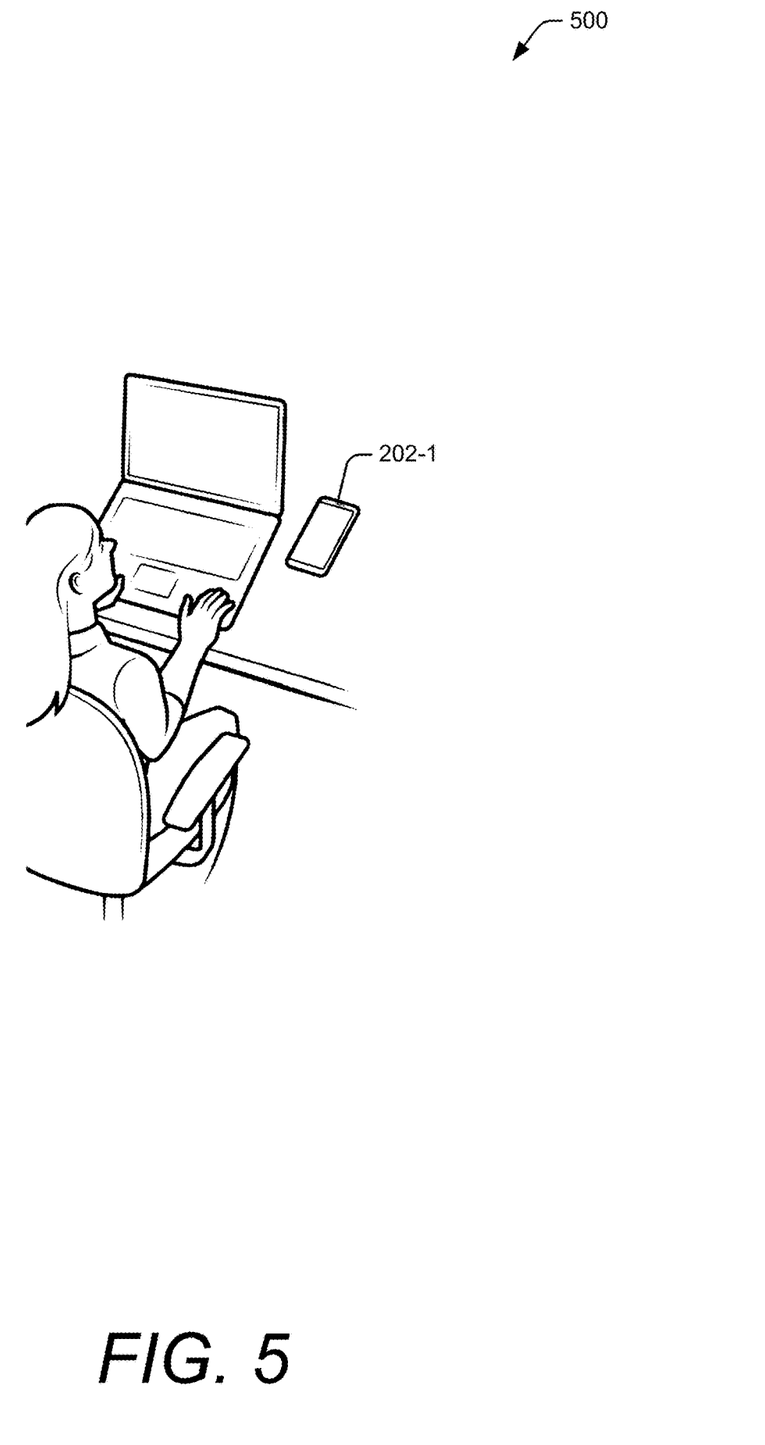
FIG. 5 illustrates an example implementation of an electronic device having the privacy manager configured to prevent eavesdropping resources from acquiring unauthorized data via mechanically excitable sensors in accordance with one or more implementations.

FIG. 5 illustrates an example implementation 500 of an electronic device 202-1 having the privacy manager 106 configured to prevent eavesdropping resources from acquiring unauthorized data via mechanically excitable sensors in accordance with one or more implementations. As illustrated, a user is typing on a keyboard of a laptop. Acoustic waves produced by the typing may excite a mechanically excitable sensor and a mechanical transducer, including a microphone, in the electronic device 202-1, causing them to produce a first electrical signal and second electrical signal, respectively. The privacy manager 106 can analyze (e.g., identify patterns) the electrical signals and generate a third electrical signal. The third electrical signal may contain signal elements of the first electrical signal and exclude signal elements of the first electrical signal determined by the privacy manager 106 to correspond to signal elements in the second electrical signal. The privacy manager 106 can then pass the third electrical signal to resources in lieu of the first electrical signal effective to reduce the amount of information associated with the one or more mechanical excitations sensed by the mechanically excitable sensor to be received by the resource. In some implementations, the privacy manager 106 passes post-processed data (e.g., the third electrical signal) to the resources instead of the first electrical signal. As a result, the privacy manager 106 passes compensated data (e.g., the third signal) to the resources. In this way, the privacy manager 106 may prevent eavesdropping resources from acquiring unauthorized data via mechanically excitable sensors.

Figure 6:
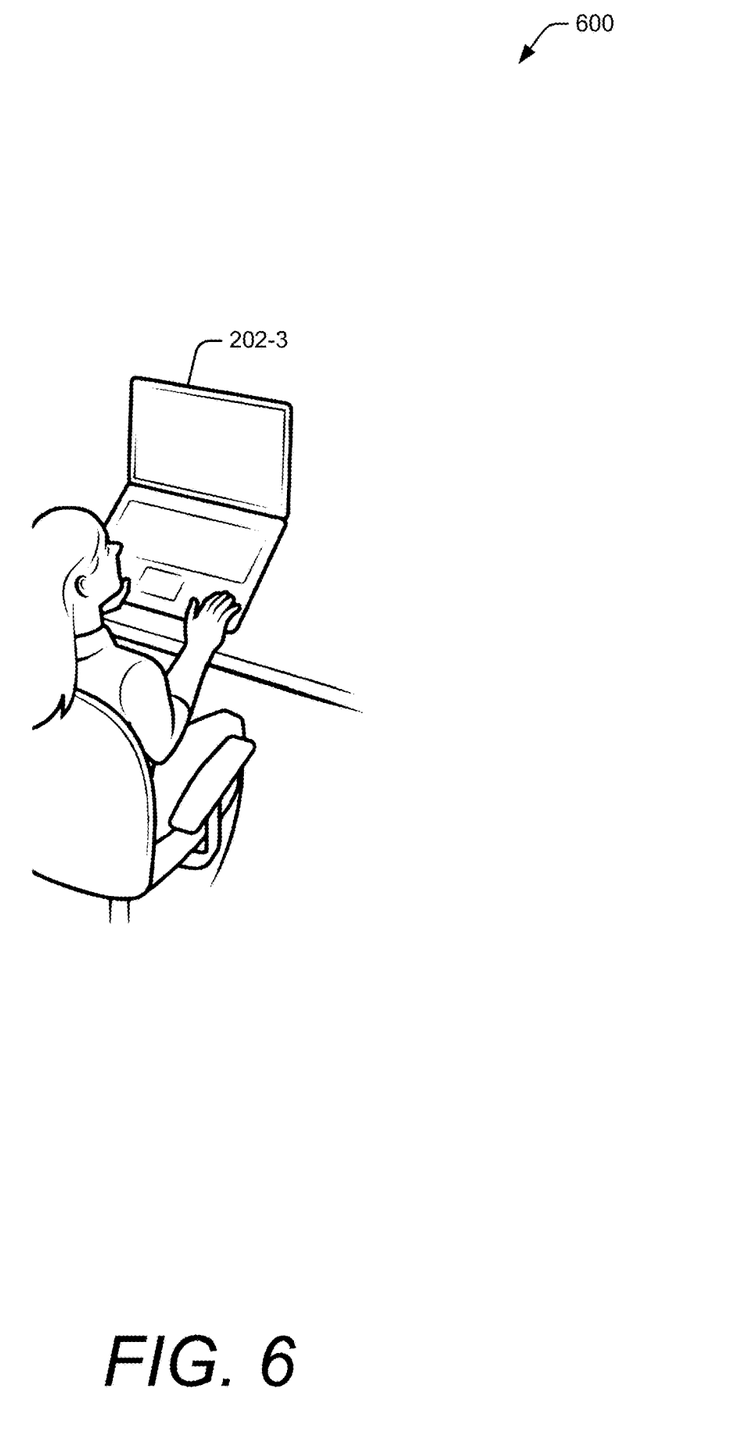
FIG. 6 illustrates another example implementation of an electronic device having the privacy manager configured to prevent eavesdropping resources from acquiring unauthorized data via mechanically excitable sensors in accordance with one or more implementations.

FIG. 6 illustrates another example implementation 600 of an electronic device 202-3 having the privacy manager 106 configured to prevent eavesdropping resources from acquiring unauthorized data via mechanically excitable sensors in accordance with one or more implementations. As illustrated, a user is typing on a keyboard of the electronic device 202-3. Mechanical waves produced by the typing may propagate through the housing of the electronic device 202-3 and excite a MEMS IMU and a microphone, causing them to produce a first electrical signal and second electrical signal, respectively. The privacy manager 106 can analyze the electrical signals and generate a third electrical signal, containing signal elements of the first electrical signal and excluding one or more other signal elements of the first electrical signal determined by the privacy manager 106 to correspond to signal elements in the second electrical signal. The privacy manager 106 can then pass the third electrical signal to resources in lieu of the first electrical signal. In some implementations, the privacy manager 106 passes post-processed data (e.g., the third electrical signal) to the resources instead of the first electrical signal. As a result, the privacy manager 106 passes compensated data (e.g., the third signal) to the resources.

Figure 7:
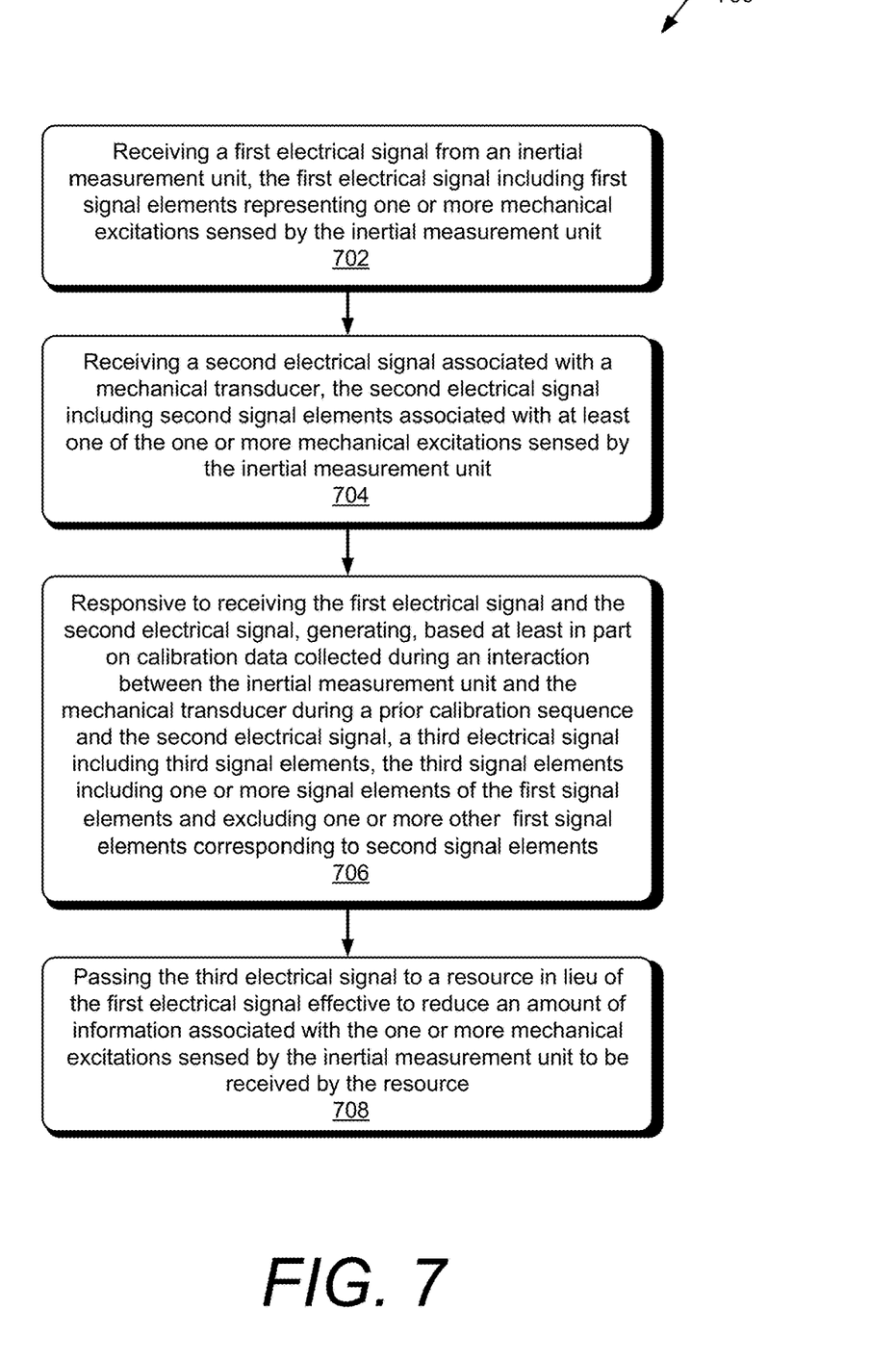
FIG. 7 depicts a method configured to prevent eavesdropping resources from acquiring unauthorized data via mechanically excitable sensors in accordance with some implementations.

FIG. 7 depicts a method 700 configured to prevent eavesdropping resources from acquiring unauthorized data via mechanically excitable sensors in accordance with some implementations. This method is shown as sets of blocks that specify operations performed but are not necessarily limited to the order or combinations shown for performing the operations by the respective blocks. In portions of the following discussion, reference may be made to operating environment 200 of FIG. 2 and entities detailed in FIGS. 3, 4, 5, and 6 for example only. The techniques are not limited to performance by one entity or multiple entities operating on one device.

At 702, the privacy manager 106 receives a first electrical signal from an inertial measurement unit. The first electrical signal may include first signal elements representing one or more mechanical excitations sensed by the inertial measurement unit.

At 704, the privacy manager 106 receives a second electrical signal associated with a mechanical transducer. The second electrical signal may include second signal elements associated with at least one of the one or more mechanical excitations sensed by the inertial measurement unit.

At 706, the privacy manager 106, responsive to receiving the first electrical signal and the second electrical signal, generates, based at least in part on calibration data collected during an interaction between the inertial measurement unit and the mechanical transducer during a prior calibration sequence and the second electrical signal, a third electrical signal including third signal elements. The third signal elements may include one or more signal elements of the first signal elements and exclude first signal elements corresponding to second signal elements.

At 708, the privacy manager 106, passes the third electrical signal to a resource in lieu of the first electrical signal effective to reduce the amount of information associated with the one or more mechanical excitations sensed by the inertial measurement unit to be received by the resource.

Although techniques have been described herein in relation to the privacy manager 106 configured to prevent eavesdropping resources from acquiring unauthorized data via mechanically excitable sensors, the disclosed techniques are also applicable, for example, to signal compensation (e.g., signal de-noising, compensating for sensor sensitivity). For instance, one or more of the techniques of the privacy manager 106 can be implemented to provide improved sensor performance by signal de-noising. In this way, the privacy manager 106 can boost signal accuracy and clarity. Further, the techniques described herein can utilize native mechanical transducers, as opposed to additional sensors, to facilitate the data extraction.

CONCLUSION

Although implementations for preventing eavesdropping resources from acquiring unauthorized data via mechanically excitable sensors have been described in language specific to certain features and/or methods, the subject of the appended Claims is not necessarily limited to the specific features or methods described. Rather, the specific features and methods are disclosed as example implementations for preventing eavesdropping resources from acquiring unauthorized data via mechanically excitable sensors.

What is claimed is:

1. A method comprising:
receiving a first electrical signal from an inertial measurement unit, the first electrical signal including first signal elements representing one or more mechanical excitations sensed by the inertial measurement unit;
receiving a second electrical signal associated with a mechanical transducer, the second electrical signal including second signal elements associated with at least one of the one or more mechanical excitations sensed by the inertial measurement unit;
responsive to receiving the first electrical signal and the second electrical signal, generating, based at least in part on calibration data collected during an interaction between the inertial measurement unit and the mechanical transducer during a prior calibration sequence and the second electrical signal, a third electrical signal including third signal elements, the third signal elements including one or more signal elements of the first signal elements and excluding one or more other first signal elements corresponding to the second signal elements; and
passing the third electrical signal to a resource in lieu of the first electrical signal effective to reduce an amount of information associated with the one or more mechanical excitations sensed by the inertial measurement unit to be received by the resource.

2. The method of claim 1, further comprising, prior to determining the third electrical signal, determining that the resource is not authorized to receive the second electrical signal.

3. The method of claim 1, wherein the resource is a processor, a device, an application, a server, or a memory.

4. The method of claim 1, wherein the mechanical transducer is configured to generate mechanical excitations responsive to receiving the second electrical signal.

5. The method of claim 4, wherein the mechanical transducer includes a speaker and/or a haptic mechanism.

6. The method of claim 1, wherein the mechanical transducer is configured to receive mechanical excitations effective to generate the second electrical signal.

7. The method of claim 6, wherein the mechanical transducer includes a microphone and/or a pressure sensor.

8. The method of claim 1, wherein information associated with the one or more mechanical excitations of the inertial measurement unit includes speech of a user or audio output of a speaker.

9. The method of claim 1, further comprising determining whether the one or more mechanical excitations of the inertial measurement unit originated from an internal source or an external source.

* * * * *